UNITED STATES PATENT OFFICE.

WILLIAM H. BURNET, OF CHICAGO, ILLINOIS.

ARTIFICIAL BUTTER AND METHOD OF MAKING THE SAME.

SPECIFICATION forming part of Letters Patent No. 266,580, dated October 24, 1882.

Application filed June 30, 1882. (No specimens.)

*To all whom it may concern:*

Be it known that I, WILLIAM H. BURNET, of the city of Chicago, in the county of Cook and State of Illinois, have invented certain new and useful Improvements in Artificial Butter and Methods of Making the Same; and I do hereby declare that the following is a full, clear, and exact description thereof.

This invention relates to improvements in artificial products resembling and intended to take the place of butter; and it consists in a compound composed of the ingredients hereinafter specified, combined in manner and proportions substantially as set forth.

The ingredients of my improved compound consist of hog's lard, fresh beef-suet, cream-butter, and glycerine, together with a due proportion of salt and water, and suitable coloring-matter. These ingredients enter into the compound in substantially the following proportions, viz: lard, fifty to sixty per cent.; butter, thirty to thirty-five per cent.; beef-suet, five to ten per cent.; glycerine, one to two per cent.; salt and water together, five to ten per cent., and annatto or other coloring-matter in due quantity to give the desired complexion to the product.

In the manufacture of the product choice leaf-lard is employed, which, having been hashed, is carefully rendered in such manner as to obliterate the swine flavor characteristic of the commercial article. The lard is then chilled quickly by immersion in cold water, after which it is cured by mixing it with salt, and exposing it in thin bodies, thus mixed, to the action of the air for a period of about ten days. The butter and beef-suet, or oleomargarine-stock, are then worked in with the lard, together with the glycerine and a due quantity of salt and coloring-matter.

Prior to my invention pressed beef-fat and butter have been compounded largely in the production of a substitute for butter, commonly known as "oleomargarine," and inferior products have been made, in which hog's fat has been used wholly in place of the beef-suet. The hog's fat, however, when used in the proportion in which beef-fat had been used and without special preparation, has been found to be unfit to make a product that will stand up or retain its sweetness in high temperatures.

After careful experiment I have found that by curing the leaf-lard in the manner specified, and by combining therewith and with the beef-suet and butter, in the proportions named, a small quantity of glycerine a product is obtained which retains its sweetness and form equally with superior grades of cream-butter, and one which is adapted to transportation and storage in the warmer seasons and climates. Not only does the glycerine, added to that already present in the fat, operate as an active preservative, tending to keep the product sweet under unfavorable conditions of temperature, but it also has the effect of giving greater coherence to the body with which it is incorporated, and prevents its adhesion to the trier or knife, thus giving to the product a stronger resemblance to butter, and adapting it more perfectly to table use.

The invention as described involves as essential features thereof the curing of the leaf-lard by long exposure after salting, as set forth, and the combination of the lard thus cured with the other substances mentioned.

I claim as my invention—

1. The process of making the butter-like product described, which consists in first rendering the hog's fat, then curing the same in the manner described, and thereafter combining therewith the ingredients mentioned, substantially as and in the proportions set forth.

2. The butter-like product described, consisting of the ingredients specified—to wit, lard, beef-suet, butter, glycerine, salt, water, and coloring-material—in substantially the proportions set forth, the lard having been rendered and subsequently cured, as stated.

In testimony that I claim the foregoing as my invention I affix my signature in presence of two witnesses.

WILLIAM H. BURNET.

Witnesses:
M. E. DAYTON,
HARRIE T. SHAFER.